US008381262B2

(12) United States Patent (10) Patent No.: US 8,381,262 B2
Risher et al. (45) Date of Patent: Feb. 19, 2013

(54) BLOCKING OF SPOOFED E-MAIL

(75) Inventors: Mark E. Risher, San Francisco, CA (US); Mark Delany, Sunnyvale, CA (US); Anirban Kundu, San Francisco, CA (US); Miles A. Libbey, IV, Mountain View, CA (US); Masumi Taketomi, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1096 days.

(21) Appl. No.: 12/034,602

(22) Filed: Feb. 20, 2008

(65) Prior Publication Data

US 2009/0210501 A1 Aug. 20, 2009

(51) Int. Cl.
*H04L 29/06* (2006.01)

(52) U.S. Cl. .......................................... 726/3

(58) Field of Classification Search ...... 726/3; 713/162, 713/176
See application file for complete search history.

(56) References Cited

U.S. PATENT DOCUMENTS

| | | | | |
|---|---|---|---|---|
| 6,986,049 | B2 * | 1/2006 | Delany | 713/176 |
| 7,054,905 | B1 * | 5/2006 | Hanna et al. | 709/206 |
| 2003/0050981 | A1 * | 3/2003 | Banerjee et al. | 709/206 |
| 2005/0071432 | A1 * | 3/2005 | Royston, III | 709/206 |
| 2006/0010215 | A1 * | 1/2006 | Clegg et al. | 709/206 |
| 2010/0312621 | A1 * | 12/2010 | Abdulhayoglu | 705/14.4 |

OTHER PUBLICATIONS

"Yahoo DomainKeys System Might Dent Spam," ITtoolbox Blogs: Viewpoint of a Linux Technologist, Dec. 2003, 4 pages, http://blogs.ittoolbox.com/linux/technologist/archives/yahoo-domainkeys-system-might-dent-spam-241 (accessed Jan. 4, 2008).

Burrell, Bruce, P., "The Plague of Viruses That Send Email with Forged "From:" Fields," U-M Virus Busters, Apr. 2004, 7 pages, http://virusbusters.itcs.umich.edu//forged_from.html (accessed Jan. 23, 2008).

Delany, M., "Domain-Based Email Authentication Using Public Keys Advertised in the DNS (DomainKeys)," Network Working Group: RFC 4871, May 2007, 39 pages, http://ietf.org/rfc/rfc4870.txt (accessed Jan. 4, 2008).

"Email—Why am I Getting Messages that Say I Tried to Send a Virus?," Forged Emails—Explained, Aperature.org: Technology, Computers, and Photography, 2 pages, http://www.aperature.org/forged_email.aspx (accessed Jan. 23, 2008).

Wong, M., "Send Policy Framework (SPF) for Authorizing Use of Domains in E-Mail, Version 1," Network Working Group: RFC 4408, Apr. 2006, 48 pages, http://tools.ietf.org/html/rfc4408 (accessed Feb. 7, 2008).

* cited by examiner

*Primary Examiner* — Jason Gee

(74) *Attorney, Agent, or Firm* — Frommer Lawrence & Haug LLP; Jamie L. Wiegand

(57) ABSTRACT

Embodiments are directed towards detecting and reporting use by a domain of a message authentication mechanism, such as DomainKeys (DK), and/or DomainKeys Identified Mail (DKIM), and enabling subsequent blocking of messages based, in part, on its usage. When a message is received by an inbound message server, a message source is determined for the message. In one embodiment, the message source is a domain name associated with the sender of the message. Statistics are recorded about the message, including the message source, whether the message is suspect, includes a forged source identifier, employs DK/DKIM message authentication, and the like. The reports may then be sent to various message sources to enable them to determine the extent of use of DK/DKIM message authentication, and to selectively block, re-direct, or forward the messages based, in part, on the use of DK/DKIM message authentication mechanism.

17 Claims, 6 Drawing Sheets

BLOCKING OF SPOOFED E-MAIL

TECHNICAL FIELD

The present invention relates generally to computing security, and more particularly but not exclusively to blocking messages allegedly from given domain addresses based on use or non-use of a message authentication mechanism, such as DomainKeys or DomainKeys Identified Mail, by the given domain.

BACKGROUND

Today, creating and sending e-mail using a fake sender's address is trivial. One simply issues selected commands to a Simple Mail Transfer Protocol (SMTP) server to send a message with virtually any email address in a From: field of the message. The reasons for sending fake email include enabling the sender to deliver adware, spyware, viruses, and/or spam to an unsuspecting recipient. The end result is that many people have experienced receiving email messages with forged or faked From address information. Forging and/or faking email addresses is now so rampant of a problem that a large number of email system administrators sometimes will simply block all email from popularly forged domains.

There have been numerous attempts to solve this problem. One such approach employs domain-based email authentication using public keys advertised in a Domain Name Server (DNS). This approach is known as DomainKeys, and has been described in detail in U.S. Pat. No. 6,986,049, entitled "Method and System for Authenticating a Message Sender Using Domain Keys," to Mark Delany, issued on Jan. 10, 2006, which is incorporated herein by reference. Domain-Keys (DK) are also described in several Requests for Comments (RFCs) available through the Internet Engineering Task Force (IETF), including RFCs: 4870 and 4871 (entitled "DomainKeys Identified Mail (DKIM) Signatures"), each of which are also incorporated herein by reference.

Briefly, DomainKeys is a message authentication system that enables a domain owner to prove that a message, such as an email message, originated from an authorized user within their domain by using a private key component to digitally sign each outbound message. Using a public key component, the recipient system can check the validity of the digital signature accompanying the incoming message and thus prove (authenticate and verify) that the message originated from a sender address authorized by the domain owner.

Unfortunately, while DomainKeys is useful to indicate that an email message is from a given domain, it does not appear to provide any indication that an unsigned message is forged or whether it is from a domain that the message says it is from. Other email authentication mechanisms, such as Sender Policy Framework (SPF), and the like, appear to have similar deficiencies. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION

Figure 1:
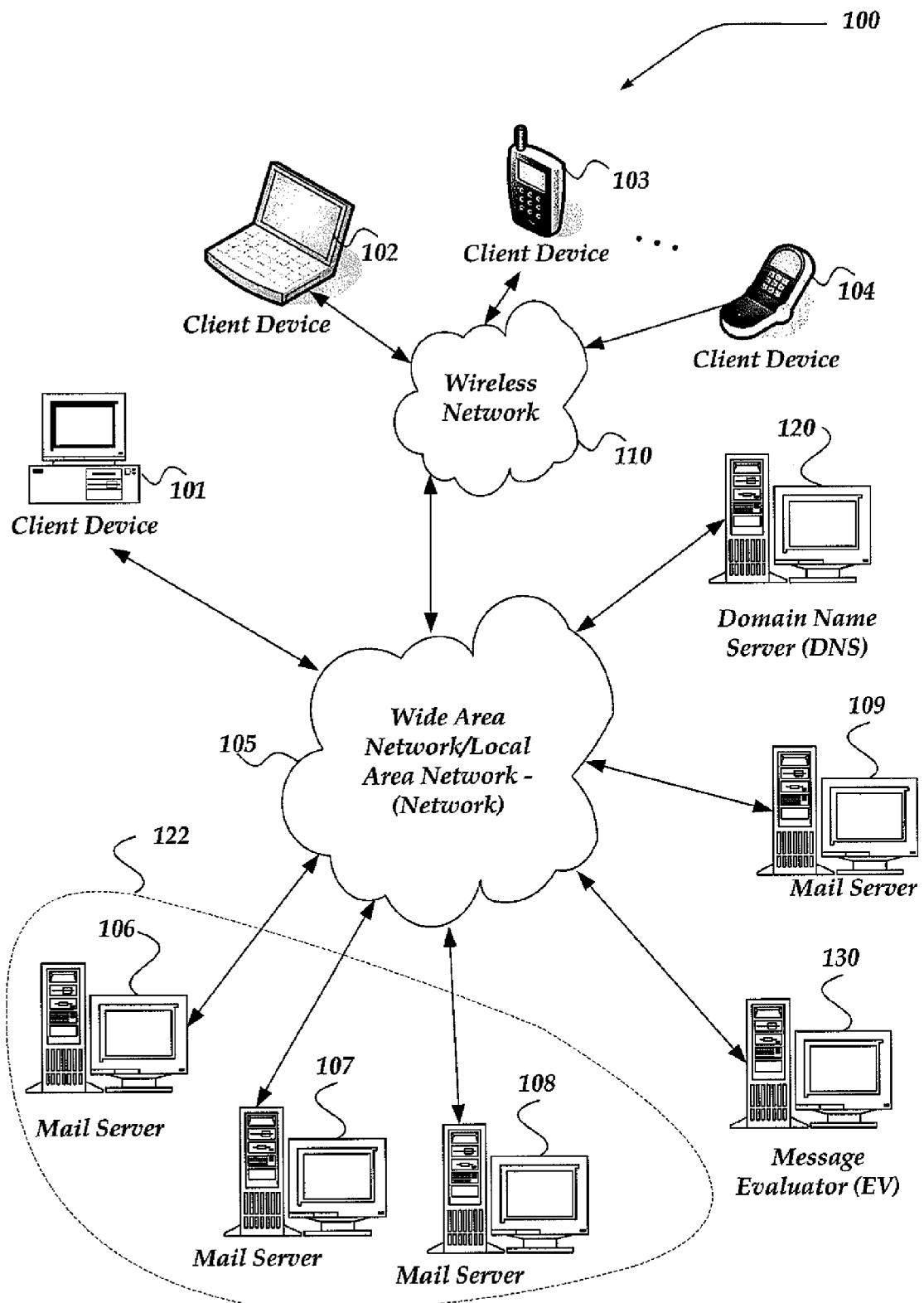
FIG. 1 shows a functional block diagram illustrating an environment for use in detecting image spam.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "domain owner" refers to a representative or other designated entity that is authorized to administer an internet domain name, referred herein as a "domain" in the Internet Domain Name System ("DNS"). The term "sender address" refers to a message address, such as an email address, that is employed in the message to identify a sender of the message. The sender address is typically, but not necessarily, provided within a "From:" header line in the message. Sender address also refers to a claimed or alleged message address of the sender, however, identified.

The terms "outbound message server," or "outbound mail server," refer to network devices configured to operate as a message server to send messages on behalf of a client device, or other network device to a destination. Typically, an outbound mail server is associated with messages sent by a sender address to a destination or recipient address. The messages are typically received, over the network, by an "inbound message server" or "inbound mail server." Such inbound mail servers refer to those network devices configured to operate to receive a message for a recipient address. Thus, a message path typically may be sent by a sender using an outbound message server, over the network, where it is received by an inbound message server. The message may then be delivered or otherwise accessed by the recipient through the inbound message server. As may be readily apparent, a mail server may be configured to operate as both an inbound mail server, to receive messages, and an outbound mail server, to send messages.

As used herein, the terms "message authentication mechanism," "message sender authentication mechanism," and "DK/DKIM message authentication," refer to any of a variety of message sender authentication systems, such as Domain-Keys, Domain Keys Identified Mail, and those derived therefrom, that are configured to authenticate a message sender based, in part, on a sender domain. In one embodiment, such terms further include use of similar message sender authentication systems such as Sender Policy Framework, or the like, and those derived therefrom.

Briefly, various embodiments of the invention are directed towards managing messages based on whether a sender domain employs a message authentication mechanism, such as DomainKeys (DK), DomainKeys Identified Mail (DKIM), or the like. When it is determined that a particular domain employs DK/DKIM message authentication above a specified threshold, then various message services, may use such information to reject, and/or re-direct messages alleging to come from that domain, but which failed to use a valid DK/DKIM message authentication signature. Thus, unsigned and/or signed but invalid messages may be automatically blocked by an inbound mail server, thereby potentially saving costs, and improving the efficiency of a mail system by reducing workload of additional processing actions.

When a message is received by an inbound message server, a message source or outbound message server is determined for the message. In one embodiment, the outbound message server may be a last hop server in a path for the message from a message sender to the inbound message server. In one embodiment, the domain name, or other network identifier, is obtained for the outbound message server. It should be noted that while a message may indicate that it is associated with a particular outbound message server, further examination of the message, its network hops, or the like, may indicate that the message is actually associated with a different outbound message server.

The message is also examined to determine if a valid DK/DKIM message authentication mechanism is employed. If so (and the message signature is determined to be authentic), then the message is forwarded to its destination. If the message is determined to not be valid (e.g., forged, invalid signature, or the like), then the message is selectively forwarded, based on a business policy, rule, or the like. For example, the message might be allowed to be forwarded to a folder, box, or the like, that is designated for suspect messages (e.g., such as a spam or bulk message folder/box). In one embodiment, the message may be rejected. If the message does not employ a message authentication mechanism, then the message may be examined using any of a variety of spam detection mechanisms. For example, the message may be examined to determine whether a network identifier for the message source is in a good list, and/or a bad list. Based on whether the network identifier is found in the good list, the message may be forwarded to its destination, or if on the bad list, the message may be rejected or otherwise blocked from being delivered. In one embodiment, if a domain is found in the bad list, then messages from a sub-domain of that domain may also be considered to be within the bad list, and treated accordingly. Similarly, messages for sub-domains of domains within the good list may also be treated based on whether the domain is found in the good list. However, other mechanisms may also be employed to determine whether to forward the message or not, including, but not limited to examination of content for keywords, image spam, or the like.

In any event, whether the message is forwarded, rejected, or re-directed, statistics are recorded about each message received allegedly from a given domain. Such information includes, but is not limited to the determined outbound message server for the message, a count of messages from the outbound message server, whether the message includes a valid or invalid message sender authenticator, whether the message is detected to have a forged/faked sender identifier, whether the message employed DK/DKIM message authentication, and the like.

The reports may then be sent to various domain owners to enable them to determine the extent of use of DK/DKIM message authentication, and to manage messages based, in part, on its use. By monitoring and managing the use of such message authentication mechanisms across a domain of message servers, a reputation of the domain owners may be improved by enabling others to immediately recognize fake messages allegedly from that domain. Reputation improvements for the domain owner may instill confidence by others, improved usage of the domain as a resource, and thereby increase financial rewards for the domain owner.

Illustrative Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, Domain Name Server (DNS) 120, mail servers 106-109, and Message Evaluator (EV) 130. As illustrated, mail servers 105-108 are represented as being associated with a same domain 122.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages such as email, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), Internet Protocol (IP) address, network address, or other device identifier.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 also may include at least one other client application that is configured to receive from and to send content to another computing device. The client application may include a capability to provide and receive textual content, multimedia information, or the like. In one embodiment, at least one of client devices 101-104 may be employed to send and/or receive spam messages, configured to forge message headers, or the like. In one embodiment, at least one of client devices 101-104 might be employed to forge message headers or other information that indicates a source of the message. For example, in one embodiment, a user of one of the client devices might send messages indicating that the message is from a message sender associated with a particular domain, while in fact the message sender might be unassociated with that particular domain. Such messages typically include forged, faked, or spoofed sender addresses. Thus, various embodiments of the invention are directed to identifying whether mail servers associated with a given domain are employing a message authentication mechanism at a level to distinguish spoofed sender addresses from legitimate sender addresses.

Client devices 101-104 may include a client application that enables the user to log into a user account that may be managed by another computing device. Such user account, for example, may be configured to enable the user to receive emails, send/receive IM messages, SMS messages, access selected web pages, participate in a social networking activity, provide messages that may be viewed as spam, ham messages, or the like. However, managing of messages may also be performed without logging into the user account.

In one embodiment, one or more of client devices 101-104 may employ at least one of mail servers 106-109 to send/receive messages, such as email messages, or the like, to another computing device. In one embodiment, client devices 101-104 may employ one or more folders, directories, databases, or the like, that may be configured to receive and/or otherwise manage messages. For example, in one embodiment, client devices 101-104 may employ an inbox, a spam box, a bulk box, an outbox, and/or the like. Such 'boxes" may be managed through one or more client applications, including, for example, a client mail application, web browser mail interface application, or the like. In one embodiment, the boxes may reside on the client device. However, in another embodiment, part or all of the boxes may reside on a remote network device, such as mail servers 106-109, or the like.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple mail servers 106-109 with other computing devices, including, DNS 120, EV 130, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data transport mechanism and includes any information delivery media. By way of example, communication media includes wired media such as twisted pair, coaxial cable, fiber optics, wave guides, and other wired media and wireless media such as acoustic, RF, infrared, and other wireless media.

Mail servers 106-109 include virtually any network computing device that is configured to provide receive and/or send messages over network 105. Devices that may operate as mail servers 106-109 include, but are not limited to personal computers, desktop computers, multiprocessor systems, microprocessor-based or programmable consumer electronics, network PCs, servers, network appliances, and the like.

In one embodiment, mail servers 106-108 may be associated with a same domain 122, while mail server 109 may be associated with a different domain (not shown). That is, in one embodiment, messages sent by and/or through mail servers 106-108 may employ a same domain address. In a non-exhaustive example, in a sender email address that looks like: mysentmessage@mycompany.example.com, "example.com" may identify domain 122.

Mail servers 106-109 may include a message transfer manager, or the like, to manage messages employing any of a variety of email protocols, including, but not limited to, Simple Mail Transfer Protocol (SMTP), Post Office Protocol (POP), Internet Message Access Protocol (IMAP), NNTP, or the like. However, mail servers 106-109 are not constrained to managing email messages, and other messaging protocols, and message formats may also be employed.

In one embodiment, mail servers 106-109 may uniquely identify themselves through any of a variety of mechanisms, including an Internet Protocol (IP) address, network address, or other device identifier. In one embodiment, the identifier also may indicate a domain for which the mail server is associated (e.g., example.com, or the like).

In one embodiment, one or more client devices 101-104 may be authorized to employ one or more of the mail servers 106-108 to send/receive messages. In another embodiment, at least one of the client devices 101-104 might not be authorized to employ one of these mail servers. Such authorization might arise, for example, based on a messaging account managed through one of the mail servers, or the like. However, in at least one embodiment, a client device may be configured to enable sending of a message, such as a mail message, that appears to be from one of mail servers 106-108, based on a forged sender's address, or the like. In one embodiment, at least one of the client devices might be configured to intercept or otherwise access a message from a sender address authorized to send a message through mail servers 106-108, and modify the message contents, headers, or the like. Such modified messages might then be forwarded to one or more other network devices, as spam, or other forms of improper messages (e.g., messages with viruses, or the like).

At least one of mail servers 106-109 may be configured to employ methods and systems for verifying that a message, such as an email, instant message, or the like, actually originated from a particular domain identified in the sender's "From:" address. One mechanism that may be employed by the at least one mail server includes use of DK/DKIM message authentication as described in U.S. Pat. No. 6,986,049, or RFCs: 4870 and 4871, each of which are also incorporated herein by reference.

Thus, in one embodiment, at least one of mail servers 106-109 may use public/private key encryption pairs to securely authenticate the origination of the message from a particular domain that corresponds to the sender address. Another embodiment might employ root keys such as provided by a Certificate Authority, or the like, to authenticate the origination of the message from a particular domain.

In one embodiment, a domain owner can prove that a message originated from an authorized user within their domain by using the private key component of the key pair to digitally sign each outbound message from one of its mail servers. Using the public key component, the recipient system can check the validity of the digital signature accompanying the incoming message and thus prove (authenticate and verify) that the message actually originated from a sender address authorized by the domain owner for that domain. Process 400 of FIG. 4 describes one non-exhaustive embodiment of a general process usable to authenticate a digitally signed message.

For example, a mail server within domain 122 might send a message to another mail server, such as another mail server within domain 122, mail server 109 outside of domain 122, or the like. Similarly, messages may be received from mail server 109 by one or more mail servers 106-109. In any event, while one or more mail servers 106-108 may be configured to employ message authentication using DomainKeys, not all of the mail servers 106-108 might employ such message authentication. When all mail servers within a domain employ message authentication, then recipients of messages that claim to be associated with that domain may be quickly authenticated using DK/DKIM. Those messages that claim to be from a domain that uses DK/DKIM, but are not properly digitally signed, may then be quickly rejected or blocked as being spam, forged, or otherwise unauthenticated messages. Thus, where each mail server within a domain uses DK/DKIM, filtering of messages may be done based on a presence or absence of an authentic digital signature.

Unfortunately, for any of a variety of reasons, a mail server might not be configured within a domain to employ DK/DKIM, or similar message authentication. In such situations, messages might be sent by a sender address using a mail server not using DK/DKIM, or the like, and still be from a valid, legitimate message sender. Therefore, determining an extent of use of DK/DKIM, or similar message authentication mechanisms, enables a domain owner to take action to modify the mail servers. The present invention therefore, is directed, in part, to determining which mail servers for a domain are or are not using a message authentication mechanism, such as DK/DKIM, or the like.

Thus, in one embodiment, messages destined for a given domain may be intercepted by EV 130 and evaluated to determine whether or not message authentication is being employed, and if so, to what extent. It should be noted, that while EV 130 is illustrated as a distinct network device, the invention is not so limited. Thus, EV 130 may represent a component that is integrated within an inbound mail server, or the like. For example, in one embodiment, monitoring, reporting, and even blocking components of EV 130 described in more detail below in conjunction with FIG. 3 may be implemented within an inbound message server, such as mail server 109, or the like.

In any event, EV 130 is configured to determine whether messages from mail servers associated with a given domain are digitally signed, whether the digital signature is valid, or whether the messages are unsigned. In one embodiment EV 130 might determine a network address or other identifier for a last hop network device for a message sent from an outbound mail server. In one embodiment, the last hop network identifier might be that of the outbound message server that sent the message for a given sender address. EV 130 may then gather statistics about each message received, and generate a report usable by a domain owner. Such reports may enable the domain owner, or others, to manage message filtering based on use (and/or non-use) of message authentication by messages received allegedly from the domain.

In one embodiment, EV 130 might be configured to selectively forward messages based on the use/non-use of message authentication. However, EV 130 might further selectively forward messages using other mechanisms, including, but not limited to a list of good domain addresses, network addresses, or the like, and/or a list of known bad or suspect domain addresses, network addresses, or the like. EV 130 may employ a process such as described below in conjunction with FIG. 5 to perform at least some of its actions.

DNS 120 represents virtually any network device configured to manage domain name services. In one embodiment, DNS 120 may publish information about a given domain and that of any domain name servers of any domains "beneath" it. Thus, as may be readily recognized, DNS 120 may represent a plurality of network devices.

DNS 120 may also be employed to advertise and enable retrieval of public keys, certificates, or the like, usable by various message authentication mechanisms, such as DK/DKIM, or the like. It should be noted, however, that while DNS 120 may be a mechanism for publishing and/or retrieving of keys, the invention can support other key services in addition to and/or in place of DNS 120's infrastructure.

In one embodiment, DNS 120 may be configured to be associated with a given domain or set of domains. For example, in one embodiment, DNS 120 may be given to manage domain 122, and/or its DK/DKIM keys, certificates, or the like. In another embodiment, DNS 120 might also be configured to manage other domains, and key infrastructure, including, but not limited to a domain associated with mail server 109, or the like.

Illustrative Client Environment

Figure 2:
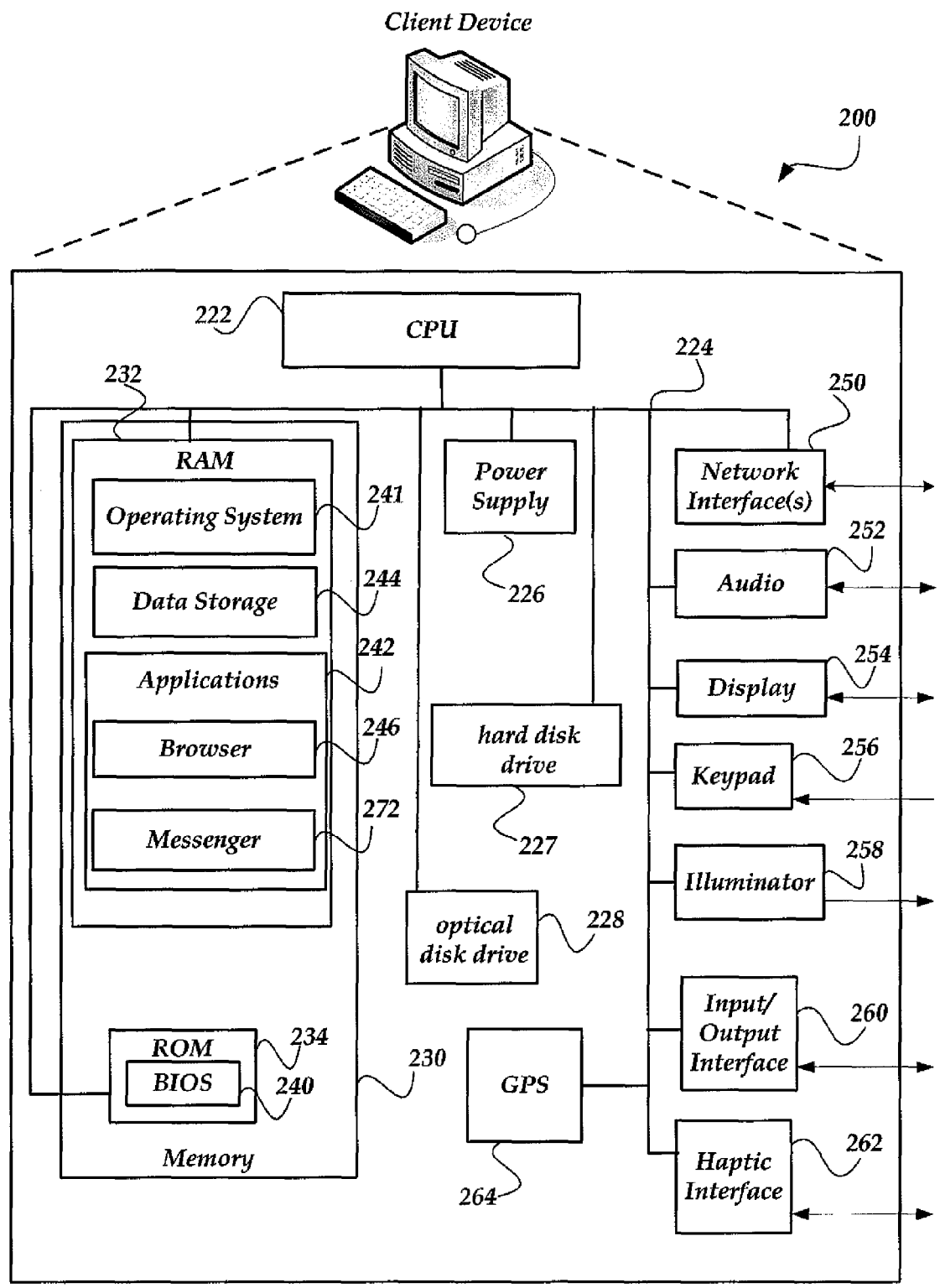
FIG. 2 shows one embodiment of a client device that may be employed within the environment illustrated in FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. In one embodiment, data storage 244 may be configured to store various message boxes, including but not limited to a message inbox, message spam box, message bulk box, message outbox, message trash box, or the like. At least a portion of the information may also be stored on a disk drive or other storage medium within client device 200, such as hard disk drive 227, optical disk drive 228, or the like. In one embodiment, a portion of the information may also be located remote to client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may also include browser 246, and messenger 272.

Browser 246 may be configured to receive and to send web pages, forms, web-based messages, and the like. Browser 246 may, for example, receive and display (and/or play) graphics, text, multimedia, audio data, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

Messenger 272 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 272 may be configured as an IM application, such as AOL Instant Messenger, Yahoo! Messenger, .NET Messenger Server, ICQ, or the like. In one embodiment messenger 272 may be configured to include a mail user agent (MUA) such as Elm, Pine, MH, Outlook, Eudora, Mac Mail, Mozilla Thunderbird, or the like. In another embodiment, messenger 272 may be a client application that is configured to integrate and employ a variety of messaging protocols. In one embodiment, messenger 272 may employ various message boxes to manage and/or store messages.

Illustrative Server Environment

Figure 3:
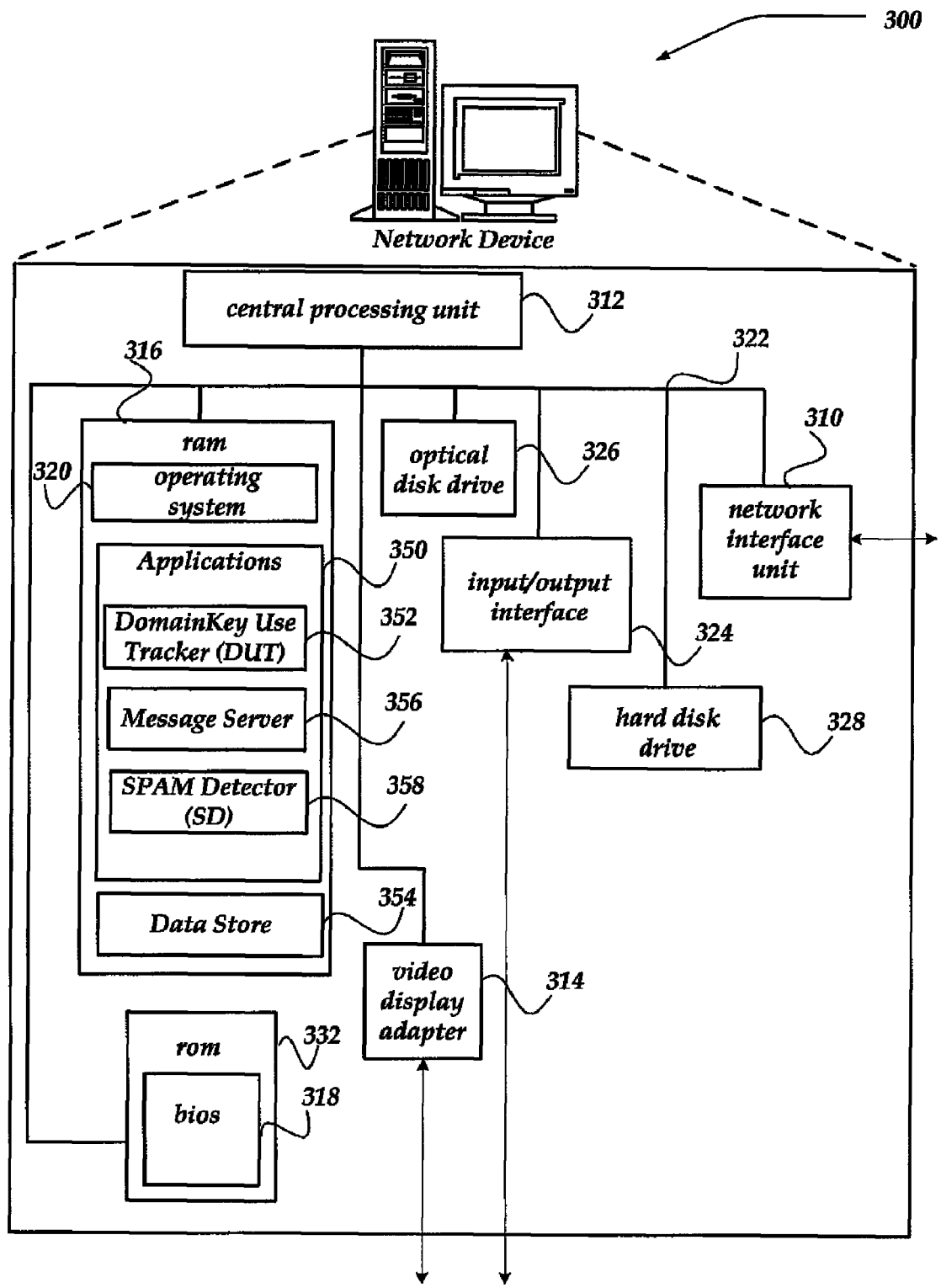
FIG. 3 shows one embodiment of a network device that may be employed to provide DK/DKIM usage reporting and/or blocking.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may, for example, represent EV 130 or even any one or more of mail servers 106-109 of FIG. 1.

Network device 300 includes processing unit 312, video display adapter 314, and a mass memory, all in communication with each other via bus 322. The memory generally includes RAM 316, and ROM 332. Network device 300 also includes one or more mass storage devices, such as hard disk drive 328, tape drive, optical disk drive, and/or floppy disk drive. The memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, network interface card (NIC), or the like.

Network device 300 may also include an SMTP handler application for transmitting and receiving email. Network device 300 may also include an HTTP handler application for receiving and handing HTTP requests, and an HTTPS handler application for handling secure connections. The HTTPS handler application may initiate communication with an external application in a secure fashion.

Network device 300 also may include input/output interface 324 for communicating with external devices, such as a mouse, keyboard, scanner, or other input devices not shown in FIG. 3. Likewise, network device 300 may further include additional mass storage facilities such as optical disk drive 326 and hard disk drive 328. Hard disk drive 328 is utilized by network device 300 to store, among other things, application programs, databases, or the like.

The memory and/or mass storage as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 350 are loaded into memory and run on operating system 320. Examples of application programs include schedulers, calendars, transcoders, database programs, word processing programs, spreadsheet programs, security programs, web servers, and so forth. Mass storage may further include applications such message server 356, DomainKey Use Tracker (DUT) 352, Spam Detector (SD) 358, and data store 354.

Data store 354 is configured and arranged to store and otherwise manage messages, statistical data, good lists (sometimes also called white lists), bad lists (sometimes called black lists), or the like. Data store 354, however, is not limited to managing storage of these example items, and other items, data, information, or the like, may also be stored within data store 354, without departing from the scope of the invention. For example, data store 354 may also include user account information, policies, procedures or the like, usable for inhibiting delivery of messages. Data store 354 may be implemented using a variety of technologies, including, but not limited to, folders, spreadsheets, data bases, scripts, applications, or the like.

Message server 354 may include virtually any computing component or components configured and arranged to forward messages from message user agents, and/or other message servers, or to deliver messages to a local message store, such as data store 354, or the like. Thus, message server 354 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like.

However, message server 354 is not constrained to email messages, and other messaging protocols may also be managed by one or more components of message server 354. Thus, message server 354 may also be configured to manage SMS messages, IM, MMS, IRC, mIRC, or any of a variety of other message types. In one embodiment, message server 354 may interact with DUT 352 to track and/or otherwise manage messages. Message server 354 may also be configured to manage various aspects of a message authentication mechanism to digitally sign messages, and/or determine whether a message is digitally signed and/or valid. Message server 354 may further deliver messages to a destination (recipient's) inbox, bulk, or the like, based, in part on various filtering mechanisms, policies, or the like. In one embodiment, message server 354 might employ process 400 described below in conjunction with FIG. 4 to digitally sign outbound messages using a message authentication mechanism. Similarly, message server 354, may employ portions of processes 500 and 600 described in more detail below in conjunction with FIGS. 5-6 to determine whether a domain is employing message authentication mechanisms above a given threshold (process 500) and/or manage received messages (process 600).

Figure 5:
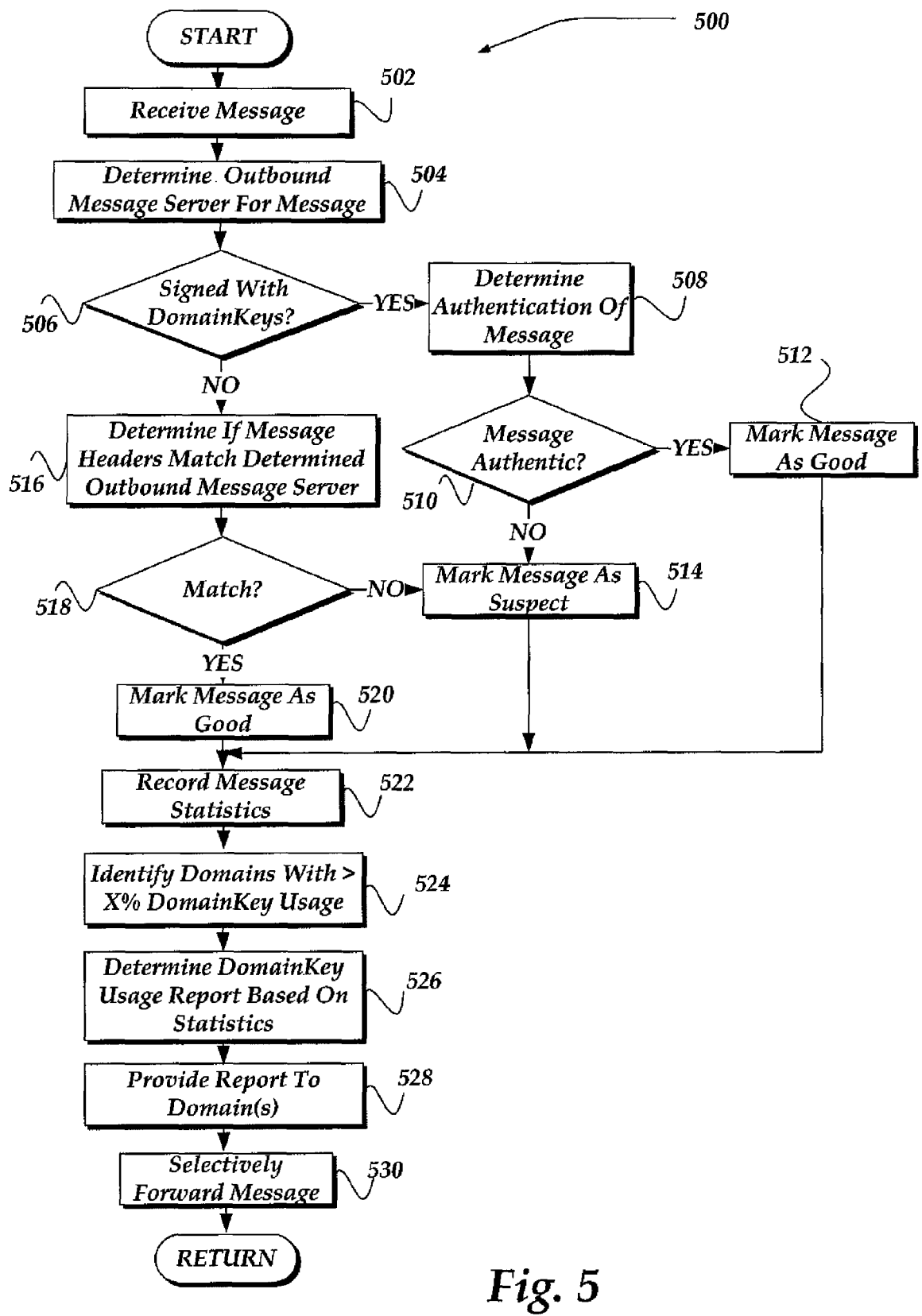
FIG. 5 illustrates a flow diagram generally showing one embodiment of an overview of process of generating statistics on the use of digitally signed messages for a domain.

DUT 352 may employ process 500 of FIG. 5 to manage and report statistics about received messages. For example, as messages are received by network device 300, an outbound message server may be determined for the message. In one embodiment, the outbound message server may be different from that which might be indicated within a message From: header. In one embodiment, the determined outbound message server might then be determined to be a last hop network device, such as a proxy device, gateway, mail server, or the like, before being received by message server 356, operating as an inbound mail server.

DUT 352 may then determine whether the messages are digitally signed, and whether the signature is authentic. DUT 352 may then generate a report based on characteristics of the messages for a given domain. The report may then be sent to the domain owner for use in selectively blocking messages allegedly from the domain associated with digitally signed messages. In one embodiment, the report may also be used by SD 358 to selectively block messages based on various rules, policies, or the like, including but not limited to whether a domain is determined to employ a message authentication mechanism above a threshold. In one embodiment, if a domain is determined to employ message authentication mechanisms above the threshold, then SD 358 might further expect and therefore treat messages from a sub-domain of that domain in a similar manner, and expect those sub-domains to also employ message authentication.

SD 358 may also employ any of a variety of other detection mechanisms to determine whether an unsigned message is spam, malware, or the like. Thus, SD 358 might examine the outbound message server to determine if it is identified within a good list, bad list, or the like. SD 358 might also examine the content of the unsigned messages to determine if the content indicates the message as spam, or the like. As may be apparent, however, such other detection mechanisms may result in an increased cost to the inbound message server, over monitoring for proper use of message authentication by messages. SD 358 may employ a process substantially similar to process 600 of FIG. 6 to perform at least some of its actions.

Generalized Operation

Figure 4:
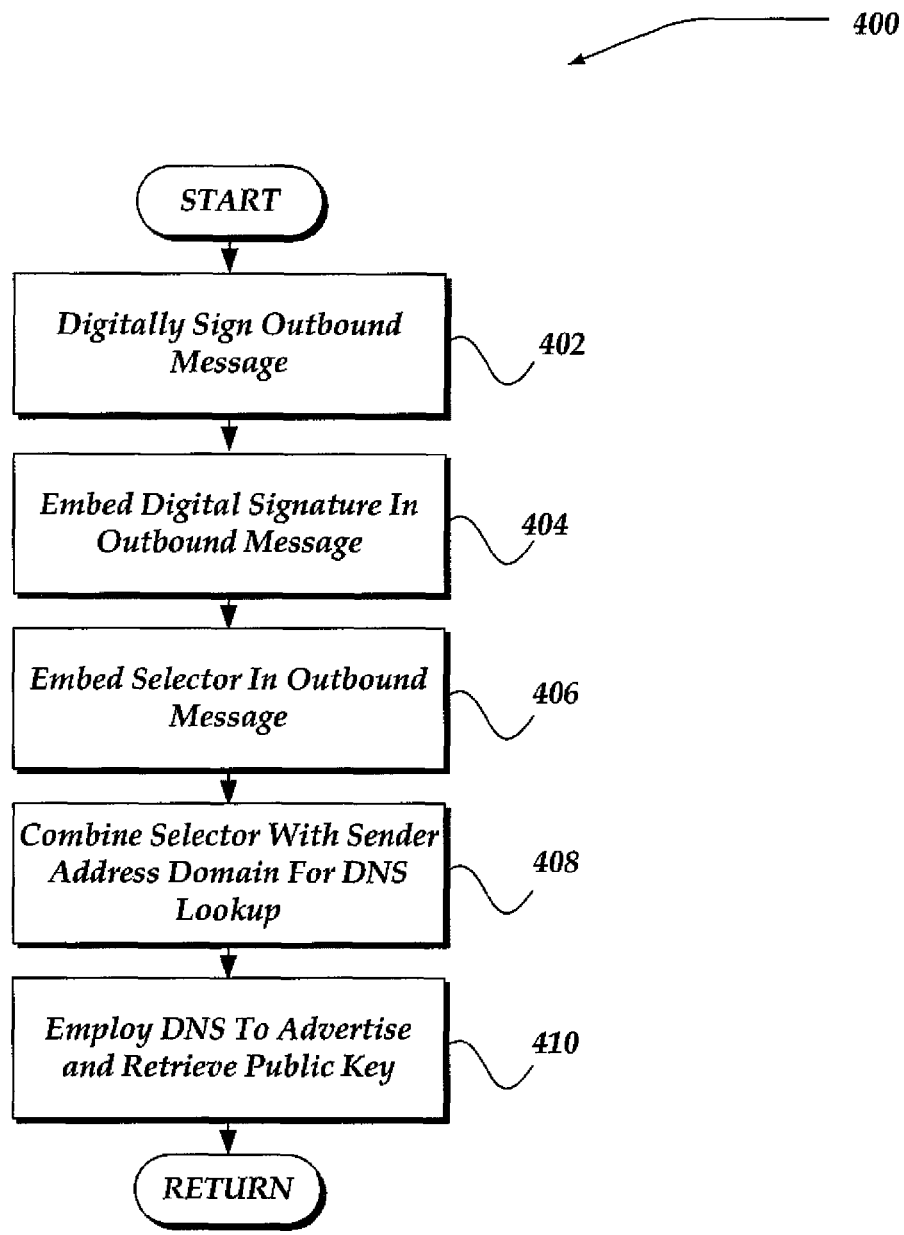
FIG. 4 illustrates a flow diagram generally showing one embodiment of an overview of process for sending a digitally signed outbound message, such as an email, using public keys advertised in DNS.

The operation of certain aspects of the present invention will now be described with respect to FIGS. 4-6. FIG. 4 illustrates a flow diagram generally showing one embodiment of an overview of process for sending a digitally signed outbound message, such as an email, using public keys advertised in DNS. Process 400 of FIG. 4 may be implemented within any of one or more of mail servers 106-109 operating as outbound message servers.

Process 400 begins, after a start block, at block 402, where a message is generated by a message sender and provided to a mail server for the domain associated with the sender's address. At block 402, the mail server confirms that the sender is authorized to send a message from the domain, using any of a variety of mechanisms, including, but not limited to the sender is associated with a valid messaging account, or the like. If the sender is authorized, then the message is digitally signed using a private key component associated with the public/private key pair for the DK/DKIM message authentication mechanism. The signature may then be inserted in the header of the message. In one embodiment, a "from domain" may be extracted from a sender address in the message headers. A selector that uniquely identifies a particular private/public key used to verify the digital signature of the outgoing message is also selected. Together, the "from domain" and the selector are used to generate the digital signature based on, the set of header lines, separating lines, and content lines, including, but not limited to termination characters and the like.

Moving to block 404, the digital signature is embedded in the outbound message. Next, at block 406, the DK/DKIM selector is embedded in the outbound message which can be then be employed for the receipt and authentication of the message. Flowing next to block 408, the selector is combined with the sender address domain to form a DNS lookup query usable to retrieve the public key. Continuing next to block 410, a DNS infrastructure is then used to advertise and enable retrieval of the public key associated with the public/private keys for the message. Process 400 then returns to a calling process to perform other actions.

FIG. 5 illustrates a flow diagram generally showing one embodiment of an overview of process of reporting statistics on the use of digitally signed messages for a domain, and further for selectively forwarding messages based on the reports. Process 500 may be implemented within an inbound message server, such as mail servers 106-109 of FIG. 1. Process 500 may also be implemented in part or whole, within EV 130 of FIG. 1.

Process 500 begins, after a start block, at block 502 where a message is received. Moving to block 504, an outbound message server may be determined. In one embodiment, the outbound message server may be determined based on a network identifier of a last hop network device before the message is received by the inbound message server. In another embodiment, the outbound message server may be traceable to a network device 'closer' in a network path to the message sender.

Processing continues next to decision block 506, where a determination is made whether the message is digitally signed using a message authentication mechanism, such as DK, DKIM, or the like. If so, processing flows to block 508; otherwise, processing flows to decision block 516.

At block 508, information may be extracted from the message, including information that identifies a DNS associated with the publication of the public key component, digital certificate, or the like, for the message. A TXT query may then be made to the DNS which is associated with the domain identified in the message. The TXT query may include a selector from the message for identifying the public components of the domain key pair. If found, the DNS may provide the public components at block 508, for use in verifying the domain as the origination of the message. Processing flows next to decision block 510, where a determination is made whether the message is authentic, based on the digital signature. If the message is determined to be authentic, processing flows to block 512, where, in one embodiment, the message may be marked as a 'good' message by inserting a 'good' status in the header of the digitally signed message. Processing flows to block 522.

At decision block 516, if the message is determined to not be authentic based on the digital signature, processing flows to block 518, where the message may be marked, in one embodiment, as 'suspect.' Processing may then flow to block 522.

At decision block 506, if it is determined that the message is not digitally signed, processing continues to block 516, where a determination is made whether message headers within the received message match the determined outbound message server. A match might arise, for example, where the message is from the determined outbound message server and so indicates that from, say, the From header in the message. Such messages are likely to be legitimate. However, where a message sender has attempted to forge the From header, then the determined outbound message server and the message header information is likely to be different and/or inconsistent. Thus, processing flows to decision block 518, where a determination is made whether a match is found. If not, then processing flows to block 514 to mark the message as "suspect." Processing then continues to block 522. Otherwise, if there is a match, processing continues to block 520, where the message may be marked as "good." Processing continues to block 522. It should be noted that such marking as described above need not be performed, in one embodiment, at blocks 520 and/or 514. Thus, enabling subsequent actions to be performed on the received message to further examine and identify if the message is forged, spam, or the like.

At block 522, message statistics are recorded, including, but not limited to a sender's address, a domain from which the message is alleged to be associated, whether the message is digitally signed, whether the digital signature is valid/authentic, whether the message is unsigned, as well as the determined outbound message server for the message. The report is not limited to these items, and any of a variety of other statistics about the message may also be recorded. Processing then flows to block 524.

At block 524, the statistics may be used to identify domains with message servers using message authentication mechanisms. In one embodiment, a domain may be identified that employs the message authentication mechanism at or above a defined threshold, such as 100% usage by its associated message servers, or the like. Processing then flows to block 526, where a message authentication usage report may then be generated based on the collected statistics. In one embodiment, the usage report might be generated based on an event, a time, or the like. Thus, for example, the usage report might be generated for a given domain once a month, once a week, or the like. In one embodiment, where a domain owner owns several domains, a usage report may be generated for each domain. The usage report may also include information indicating a percentage of usage of message authentication by the domain. Processing continues next to block 528, where the usage reports may be sent to a domain owner for use in managing how to selectively deliver messages.

Processing may then continue to block 530, where the received message may then be selectively forwarded to a recipient. In one embodiment, block 530 may employ the marking as described above to selectively determine whether to forward a message, block the message, or reject the message. However, in another embodiment, block 530 might employ a process substantially similar to process 600 described below to selectively forward messages. Process 500 then returns to a calling process to perform other actions.

Figure 6:
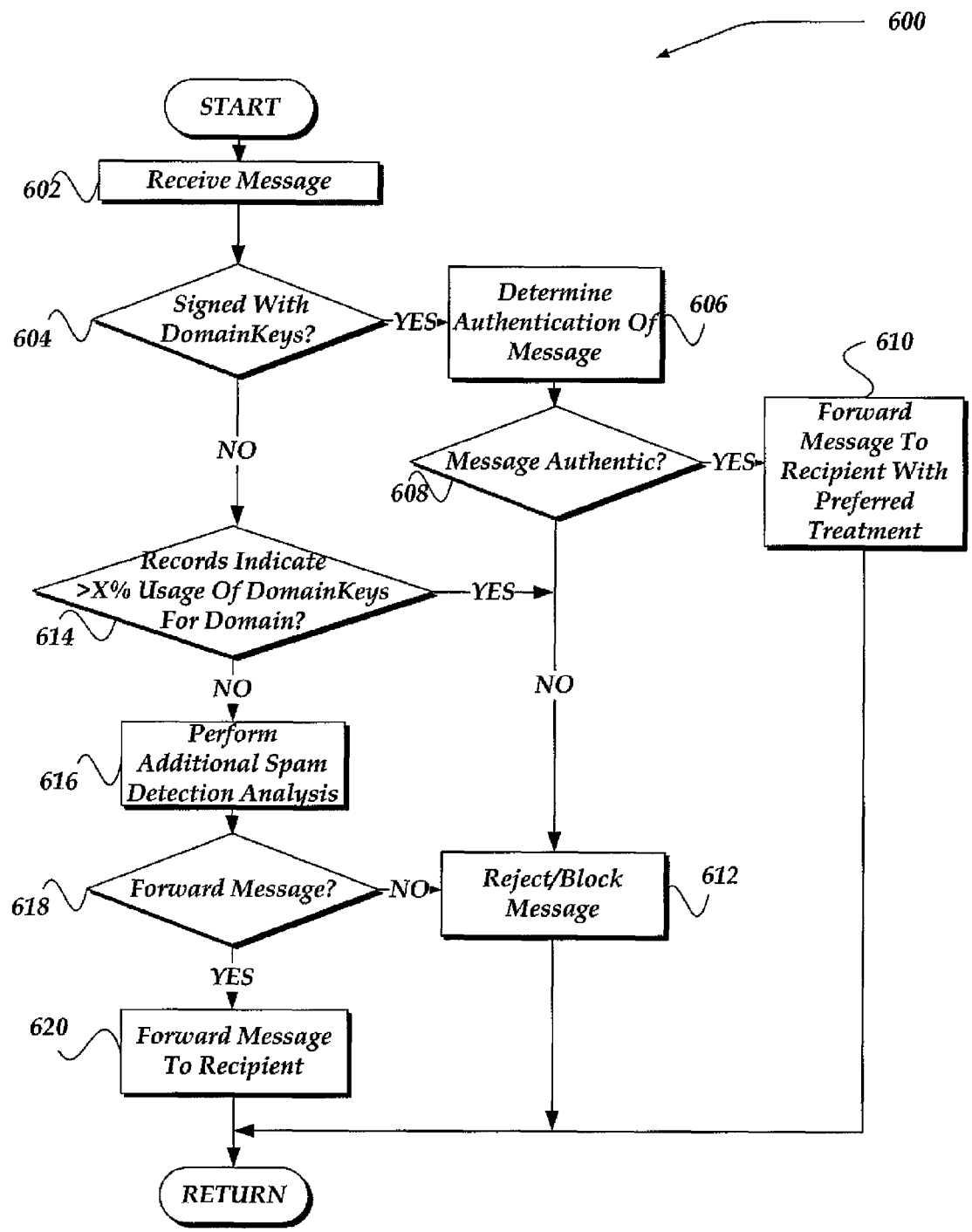
FIG. 6 illustrates a flow diagram generally showing one embodiment of an overview of process of managing messages based on whether a domain employs message authentication mechanisms, such as DK/DKIM, above a determined threshold.

FIG. 6 illustrates a flow diagram generally showing one embodiment of an overview of process of managing messages based on whether a domain employs message authentication mechanisms, such as DK/DKIM, above a determined threshold.

As such, process 600 of FIG. 6 may be implemented in any of mail servers 106-109 of FIG. 1 configured to operate as an inbound message server. However, it should be noted that process 600 may also be implemented within a client device of FIG. 1, to manage messages into a user's message folder.

In any event, process 600 begins, after a start block, at block 602, where a message is received. Processing then flows to decision block 604 where a determination is made whether the message is digitally signed using a message authentication mechanism, such as DK, DKIM, or the like. If so, processing flows to block 606; otherwise, processing flows to decision block 614.

At block 606, substantially similar to block 508 of FIG. 5, information may be extracted from the message, including information that identifies a DNS associated with the publication of the public key component, digital certificate, or the like, for the message. A TXT query may then be made to the DNS which is associated with the domain identified in the message. The TXT query may include a selector from the message for identifying the public components of the domain key pair. If found, the DNS may provide the public components at block 606, for use in verifying the domain as the origination of the message. Processing flows next to decision block 608, where a determination is made whether the message is authentic, based on the digital signature. If the message is determined to be authentic, processing flows to block 610; otherwise, processing flows to block 612, where the message may be blocked or rejected from being delivered to a destination recipient.

At block 610, where the message is determined to have an authentic digital signature, the message may be sent to the destination recipient using, in one embodiment, preferred treatment. Preferred treatment may include any of a variety of special treatment of the message, including, sending the message a higher priority routing, providing an award or other benefit to a message sender, domain owner, or the like, for using message authentication, or the like. Processing then returns to a calling process to perform other actions.

Processing at decision block 614, is directed, in determining from a provided report, such as from process 500 of FIG. 5, whether the "identified domain" for which the received message alleges to be associated uses message authentication above a defined threshold value. In one embodiment, the identified domain is found by examining the "Sender" header of the message. In another embodiment, this domain is identified by examining the "From" header of the message. In some cases, the From header may be syntactically invalid as specified by RFC 822 entitled "Standard For The Format Of ARPA Internet Text Messages," and/or RFC 2822 entitled "Internet Message Format," each of which is available through the Internet Engineering Task Force (IETF), and each of which is incorporated herein by reference. For example, the angle-address portion of the address may be missing the ">" character at the end. In yet another embodiment, the identified domain may be the parent domain of the one present in the From header. For example, the From header may be "department@messages.example.com," and the identified domain would be "example.com." If the identified domain is determined to use message authentication above a defined threshold value, then unsigned messages may be treated as suspect and/or forged messages. As such, processing may flow to block 612, where the message may be blocked, rejected, or the like. Processing would then return to a calling process to perform other actions.

However, if at decision block 614, it's determined that the domain does not employ message authentication above the defined threshold value, processing proceeds to block 616, where any of a variety of other spam detection mechanisms might be applied to the message to determine whether to forward the message, block, or reject the message. Such detection mechanisms include, but are not limited to comparisons of network addresses, sub-domains, domains, or the like associated with the message to a good list, a bad list, examining contents of the message, size of the message, or the like. Processing then flows to decision block 618, where a determination is made, based on results from block 616 how to manage the message. If the message is determined to be a suspect message, processing flows to block 612, described above. Otherwise, processing flows to block 620, where the message may be forwarded to the recipient. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing delivery of messages over a network, comprising:
   for each message in a plurality of messages alleging to be from a given domain:
      when the respective message is digitally signed, authenticating the respective message, at least by verifying that the digitally signed message originated from the given domain associated with a sender's address of the message by using a public component of a public/private key pair that is accessible to a domain name server (DNS) associated with the domain;
      when the plurality of messages from the domain indicates that the domain is employing digitally signed messages above a threshold, then blocking messages alleging to be from the domain which are determined to be digitally unsigned while still allowing messages that are digitally signed and authenticated to be forwarded to a message recipient;
      when the plurality of messages from the domain indicates that the domain is employing digitally signed messages at or below the threshold, determining an outbound message server associated with each message; and
      when an outbound message server for a respective message is inconsistent with at least one message header of the respective message, blocking the message from being delivered to a recipient.

2. The method of claim 1, wherein selectively blocking messages further comprises:
   when the message is digitally signed but is determined to be unauthentic, blocking delivery of the message to a recipient.

3. The method of claim 1, further comprising:
   when the plurality of messages from the domain indicates that the domain is employing digitally signed messages at or below the threshold, then employing at least one spam detection mechanism to determine if the respective message is spam.

4. The method of claim 1, further comprising:
   when the respective message is digitally signed and authenticated, forwarding the message to the message recipient with at a preferred priority.

5. The method of claim 1, further comprising:
   when a message in the plurality of messages alleges to be from a sub-domain associated with the given domain employing digitally signed messages above the threshold, and the message is digitally unsigned, blocking the message from being delivered to a recipient.

6. A network device for managing delivery of messages over a network, comprising:
a transceiver to send and receive data over the network; and
a processor that is operative to perform actions, including:
receiving a plurality of messages;
for each message in the plurality of messages, determining when the message is digitally signed, and when so, then authenticating the respective message, at least by verifying that the digitally signed message originated from a domain associated with a sender's address of the message by using a public component of a public/private key pair that is accessible to a domain name server (DNS) associated with the domain; and
when the plurality of messages from the domain indicates that the domain is employing digitally signed messages above a threshold, then blocking messages alleging to be from the domain which are determined to be digitally unsigned while still allowing messages that are digitally signed and authenticated to be forwarded to a message recipient;
determining an outbound message server for an unsigned message, by identifying a last hop network address as the outbound message server based on a last network hop of the message prior to being received by a message server associated with a message recipient; and
when the outbound message server is determined to be inconsistent with information within a message header of the unsigned message, blocking the message from being delivered to a recipient.

7. The network device of claim 6, wherein selectively blocking messages further comprises:
when the message is digitally signed but is determined to be unauthentic, blocking delivery of the message to a recipient.

8. The network device of claim 6, wherein authenticating the message further comprises determining whether the message is digitally signed but is modified.

9. The network device of claim 6, wherein the network device is configured to operate as an inbound mail server associated with a message recipient for the message.

10. The network device of claim 6, wherein the network device is associated with the domain.

11. The network device of claim 6, wherein the processor that is operative to perform actions, further comprising:
when a message in the plurality of messages alleges to be from a sub-domain associated with the domain employing digitally signed messages above the threshold, and the message is digitally unsigned, blocking the message from being delivered to a recipient.

12. A system for use in managing delivery of messages over a network, comprising:
a plurality of mail servers associated with a domain; and
a network device that is configured to receive messages from each of the plurality of mail servers within the domain and to perform actions, including:
receiving a plurality of messages from the plurality of mail servers;
for each message in the plurality of messages, determining when the message is digitally signed, and when so, then authenticating the respective message, at least by verifying that the digitally signed message originated from the domain associated with a sender's address of the message by using a public component of a public/private key pair that is accessible to a domain name server (DNS) associated with the domain; and
when the plurality of messages from the domain indicates that the plurality of mail servers within the domain are employing digitally signed messages above a threshold, then blocking delivery of messages alleging to be from the domain which are determined to be digitally unsigned while still allowing messages that are digitally signed and authenticated to be forwarded to a message recipient;
for each unsigned message:
determining an outbound server for each unsigned message;
determining if the outbound server is a mail server associated with the domain; and
when the outbound server is unassociated with the domain, indicating that the unsigned message is likely to be a forged or spam message.

13. The system of claim 12, wherein determining when the message is associated with a mail server within the domain based in part on a last hop outbound mail server for a sender of the message.

14. The system of claim 12, wherein selectively blocking delivery further comprises, when the message indicates it is associated with a sub-domain of the domain, but is not digitally signed, blocking the delivery of the message.

15. A non-transitory computer-readable storage medium configured to store data and instructions thereon, wherein the execution of the instructions on a computing device enable the computing device to perform actions for managing received messages over a network, comprising:
receiving a plurality of messages;
for each message in the plurality of messages: determining when the message is digitally signed, and when so, then authenticating the message, at least by verifying that the digitally signed message originated from a domain associated with a sender's address of the message by using a public component of a public/private key pair that is accessible to a domain name server (DNS) associated with the domain; and
when the plurality of messages from the domain indicates that the domain is employing digitally signed messages above a threshold, then blocking messages alleging to be from the domain which are determined to be digitally unsigned while still allowing messages that are digitally signed and authenticated to be forwarded to a message recipient;
for each unsigned message:
determining an outbound server for each unsigned message;
determining if the outbound server is a mail server associated with the domain; and
when the outbound server is unassociated with the domain, indicating that the unsigned message is likely to be a forged or spurn message.

16. The non-transitory computer-readable storage medium of claim 15, wherein selectively blocking the at least one message further comprises, if the at least one message is digitally unsigned blocking the delivery of the message.

17. The non-transitory compute r-readable storage medium of claim 15, wherein the instructions perform actions, further including generating a list of mail servers associated with the domain employing digitally signed messaging above the threshold value.

* * * * *